Patented July 5, 1949

2,474,819

UNITED STATES PATENT OFFICE 2,474,819

ACRIDINE COMPOUNDS AND PROCESS OF MAKING THE SAME

Joseph H. Burckhalter, Detroit, Eldon M. Jones and Albert L. Rawlins, Grosse Pointe Woods, Frank H. Tendick, Grosse Pointe Park, and Walter F. Holcomb, Detroit, Mich., assignors to Parke, Davis & Company, Detroit, Mich., a corporation of Michigan No Drawing. Application January 8, 1945, Serial No. 571,961

14 Claims. (Cl. 260—279)

This application is a continuation-in-part of copending application, Serial No. 539,990, filed June 12, 1944, and relates to certain new acridine derivatives and is particularly concerned with substituted acridines having the general formula,

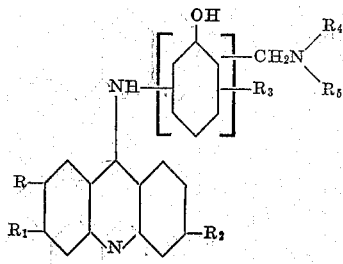

where R is hydrogen, lower alkoxy or lower alkyl, $R_1$ is hydrogen, lower alkoxy or lower alkyl, $R_2$ is hydrogen, halogen or —CN, $R_3$ is hydrogen, halogen, lower alkyl or lower alkenyl and $R_4$ and $R_5$ are the same or different and represent hydrogen, alkyl radicals containing not more than 4 carbon atoms, hydroxy alkyl radicals containing not more than 4 carbon atoms or when taken together with —N< a heterocyclic ring such as morpholine, piperidine, piperazine and thiomorpholine.

The acridine compounds of the present invention may be prepared by condensing equimolar portions of a substituted aryl amine hereinafter referred to as compound P and a haloacridine hereinafter referred to as compound H in a suitable solvent. The reaction may be carried out in the presence of alkaline, neutral or acidic media, and the reaction may be graphically represented as follows:

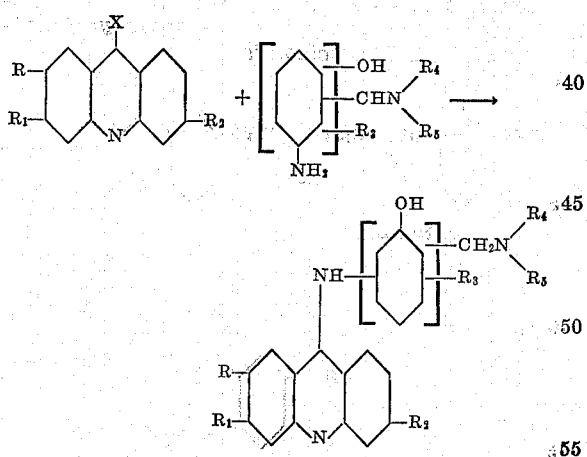

where R, $R_1$, $R_2$, $R_3$, $R_4$ and $R_5$ have the same significance as given above the X represents a halogen atom such as chlorine, bromine or iodine. We prefer to carry out the reaction in the presence of a dilute or concentrated organic acid or a dilute inorganic acid.

Another method for the preparation of the acridine compounds of the present invention, which is, in effect, a variation of the above using an acidic medium, involves the reaction of the aminophenol and a 9-chloroacridine in phenolic medium. The desired product may be precipitated from an ether suspension of the reaction mixture by the addition of hydrogen chloride.

Another method of obtaining acridine compounds according to this invention involves the direct condensation of an N-acyl derivative of

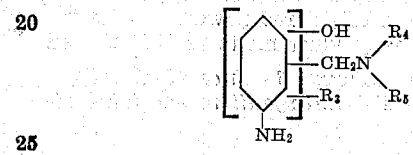

with a 9-haloacridine in acid solution. This reaction may be represented graphically as follows:

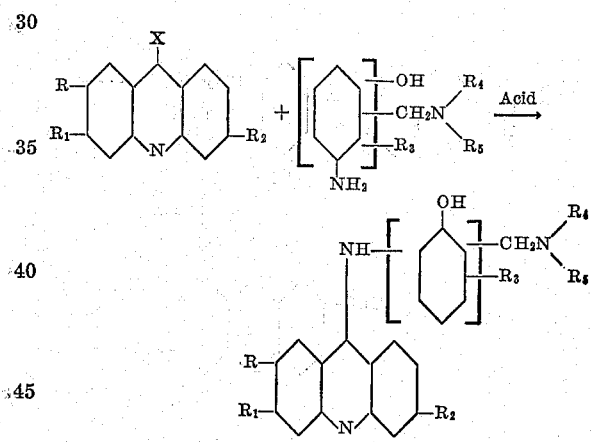

where R, $R_1$ $R_2$, $R_3$, $R_4$, $R_5$ and X have the same significance as given above. This process involves the simultaneous hydrolysis of the acylated compound and condensation of the resulting amine.

The following examples illustrate this invention but do not, however, limit it thereto:

*Example 1.—2-methoxy-6-chloro-9-(4'-hydroxy-3'-diethylaminomethyl - 5' - allylanilino) - acridine dihydrochloride*

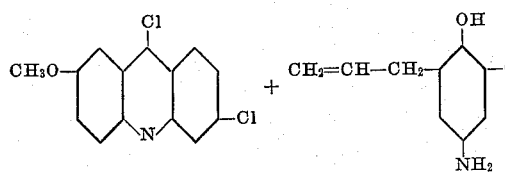

13.8 g. (0.05 mole) of 4-acetamino-2-allyl-6-diethylaminomethylphenol is boiled under a reflux condenser for one hour with 50 cc. of 6 N hydrochloric acid. The solution is cooled and treated with strong caustic soda solution until just acid to Congo red, and diluted to about 100 cc.

To this solution is added 13.9 g. (0.05 mole) of powdered 2-methoxy-6,9-dichloroacridine and the mixture heated on the steam bath for two hours, with frequent stirring. During this time the mixture becomes dark red in color. The unreacted acridine is removed by filtration from the hot solution and after cooling the filtrate is treated with an excess of ammonium hydroxide. The free base is extracted with a total of 2 l. of ether, dried over solid potassium carbonate, filtered and the filtrate evaporated to a volume of 1 liter. This is chilled and treated with excess hydrogen chloride in absolute alcohol. The dihydrochloride separates as a dark red, gummy mass which solidifies on standing. This is separated from the ether, boiled with a little methanol and diluted with an equal volume of acetone. On cooling the solution and rubbing with a glass rod, the product separates as a bright red powder. After recrystallization the product melts as 233° C. dec.

*Example 2.—2-methoxy - 6 - chloro-9-(3'-ethylaminomethyl - 4'-hydroxyanilino)-acridine dihydrochloride*

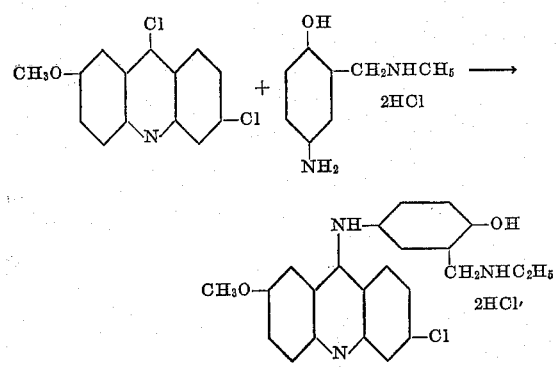

An aqueous solution of 14 g. of 2-ethylaminomethyl-4-aminophenol dihydrochloride is adjusted to pH 3 and then warmed for two hours in a steam bath with 14 g. of 2-methoxy-6,9-dichloro-acridine suspended in alcohol. The solvent is decanted from the oily product and the oil then triturated under acetone until crystallization is induced. The orange colored dihydrochloride is recrystallized from methanol.

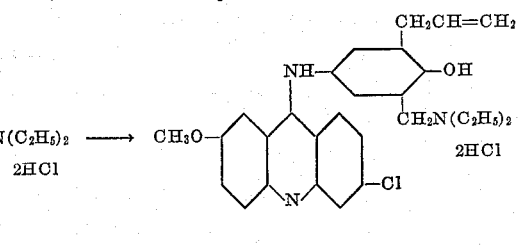

*Example 3.—2-methoxy - 6 - chloro-9-(3'-aminomethyl - 4'-hydroxyanilino)-acridine dihydrochloride*

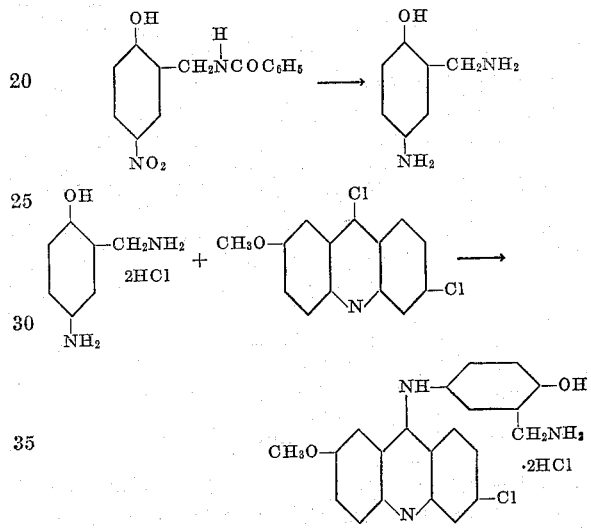

A suspension of 7 g. of 2-benzoylaminomethyl-4-nitrophenol [Einhorn, Ann., 343, 242 (1906)] and 0.1 g. of platinum oxide catalyst in 50 cc. of alcohol is shaken on a hydrogenation machine until the theoretical amount of hydrogen has been absorbed. The catalyst is then removed by filtration and the filtrate refluxed with 25 cc. of concentrated hydrochloric acid for 24 hours. This solution, which contains 2-aminomethyl-4-aminophenol, is treated with concentrated alkali to raise the pH to about 3, and then 6 g. of 2-methoxy-6,9-dichloro-acridine is added. The mixture is heated for an hour on a steam bath. After cooling, the product is collected, triturated well with water and recollected. After washing with alcohol and acetone, the orange dihydrochloride is recrystallized from alcohol.

*Example 4. — 2-methoxy-6-chloro-9-[3',5'-bis-(diethylaminomethyl) - 2' - hydroxyanilino]-acridine trihydrochloride*

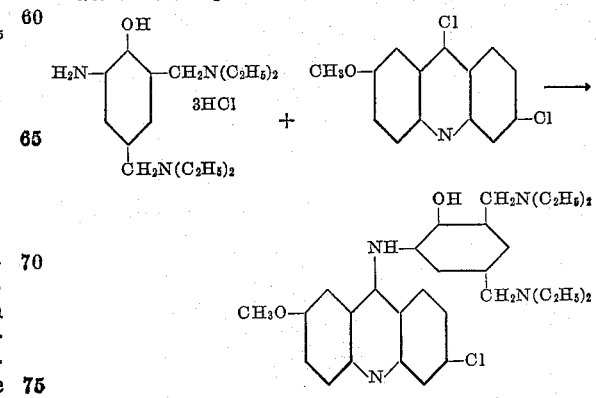

A mixture of 23 g. of 2,4-bis-(diethylaminomethyl)-6-acetaminophenol and 50 cc. of concentrated hydrochloric acid is refluxed for an hour. The pH of the solution is adjusted to about 4 by the addition of concentrated alkali, and 19 g. of 2-methoxy-6,9-dichloroacridine suspended in 50 cc. of alcohol is then added. This mixture is heated for a period of three hours on a steam bath (the pH gradually drops during the first part of the period). After standing for a few hours, an orange trihydrochloride separates and is purified by recrystallization from methanol-ether, M. P. 257° C. dec.

Purification, especially for the removal of sodium chloride and the insoluble acridine, may also be effected by treatment of the crude trihydrochloride with concentrated ammonia and extraction of the free base with ether. The extract is washed well with water and then dried over anhydrous potassium carbonate. The filtered solution is treated with an excess of alcoholic hydrogen chloride and the precipitated trihydrochloride is further purified by dissolving in warm methanol and precipitating with ether.

*Example 5.—2,3-dimethyl - 6 - chloro-9-(4'-hydroxy-3'-diethylaminomethylanilino) - acridine dihydrochloride*

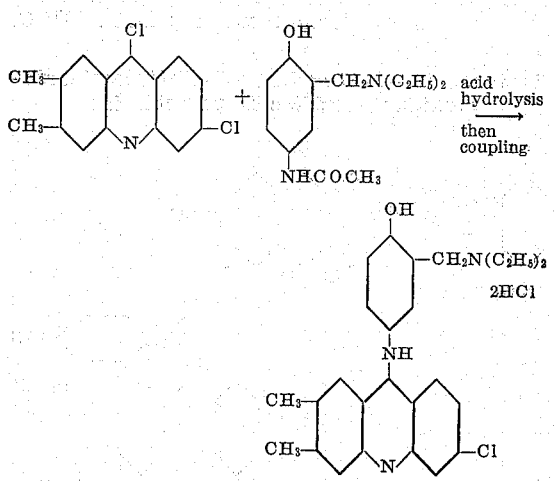

16.52 g. (0.075 mole) of 2-diethylaminomethyl-4-acetylaminophenol is refluxed for one hour in a solution of 75 cc. concentrated hydrochloric acid, 75 cc. water and 60 cc. ethanol. The pH of the solution is then adjusted to 4 with 40% sodium hydroxide solution. 18.35 g. (0.07 mole) of 2,3-dimethyl-6,9-dichloroacridine, M. P. 121° C. dec., is added and the resulting suspension refluxed for 1 hour. The ethanol is distilled in vacuo, and the free base liberated from the aqueous solution of the hydrochloride by adding excess sodium carbonate. This product is extracted with ether, filtered to remove the insoluble acridine, and the ether layer dried over anhydrous magnesium sulfate. After filtration, anhydrous hydrogen chloride is admitted to the filtrate whereupon the dihydrochloride precipitates. The product is collected and dried at 70° C. Purification is effected by dissolving the salt in a minimum of dry methyl alcohol, heating, adding sufficient warm acetone to effect incipient crystallization, and cooling slowly; M. P. of the pure salt, 259–263° C. dec.

*Example 6.—2-methoxy-6-chloro-9-(2'-hydroxy-3'-diethylaminomethyl-5'-tert. - butylanilino) - acridine dihydrochloride*

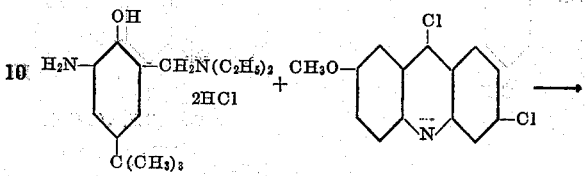

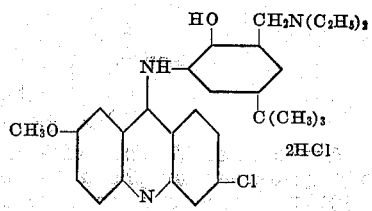

A mixture of 7 g. of 2-diethylaminomethyl-4-tert.-butyl - 6 - acetaminophenol hydrochloride (M. P. 158° C.) and 14 cc. of concentrated hydrochloric acid is heated at refluxing temperature for an hour. The pH of the solution is adjusted to 3 or 4 by the addition of concentrated sodium hydroxide solution and 5.5 g. of 2-methoxy-6,9-dichloroacridine suspended in 20 cc. of alcohol is added. The mixture is heated at 100° C. for an hour. Upon cooling, the orange dihydrochloride separates as an oil which soon crystallizes. The product is purified by dissolving in warm methanol and reprecipitation by the addition of acetone; M. P. 270° C. dec.

*Example 7.—2-methoxy-6-chloro-9-(3' - diethylaminomethyl-4'-hydroxy - 6' - chloroanilino) - acridine dihydrochloride*

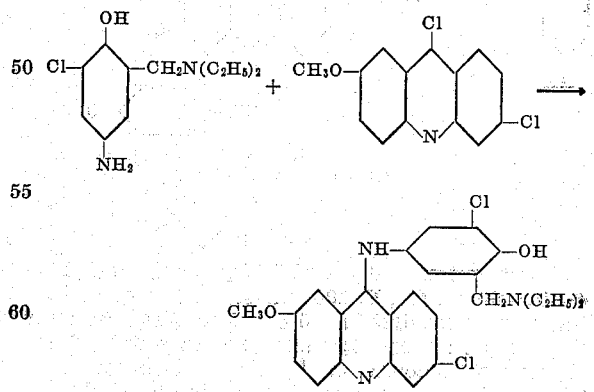

A mixture of 11 g. of 2-diethylaminomethyl-4-amino-6-chlorophenol, 13 g. of 2-methoxy-6,9-dichloroacridine and 60 g. of phenol is heated at 100° C. for two hours. The reaction mixture is poured into a large volume of ether and an excess of alcoholic hydrogen chloride added to precipitate the dihydrochloride salt. The orange product is recrystallized from methanol; M. P. 290° C. dec.

Example 8.—2-methoxy-6-chloro-9-(3' - diethylaminomethyl-2'-hydroxy - 5' - phenylanilino)-acridine dihydrochloride

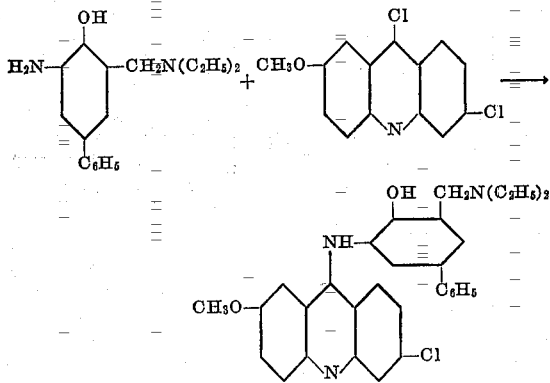

A mixture of 2.7 g. of 2-diethylaminomethyl-4-phenyl-6-acetaminophenol hydrochloride (M. P. 182° C.) and 6 cc. of concentrated hydrochloric acid is refluxed for an hour. The acidity of the mixture is adjusted to pH 3 by the addition of concentrated sodium hydroxide solution and 2.1 g. of 2-methoxy-6,9-dichloroacridine added. The mixture is heated in a steam bath until solution is effected. Upon cooling, a reddish oil separates and solidification is soon induced. The crude product is dissolved in methanol, and after the addition of acetone a crystalline orange dihydrochloride slowly forms; M. P. 274° C. dec.

Example 9.—2-methoxy-6-chloro-9-(3'-N-piperidylmethyl-4'-hydroxyanilino) - acridine dihydrochloride

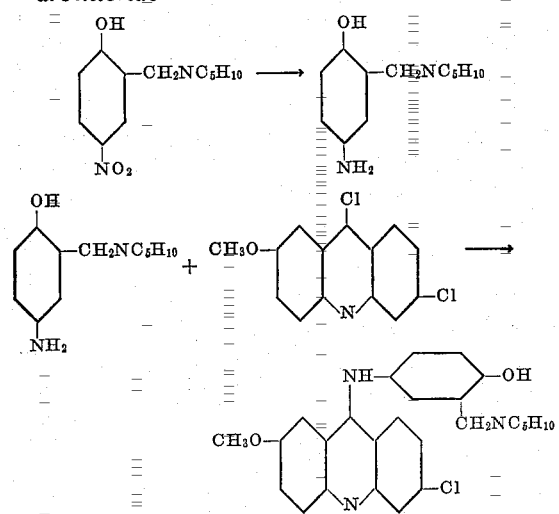

A suspension of 6.2 g. of 2-N-piperidylmethyl-4-nitrophenol (M. P. 104° C.) and 0.1 g. of platinum oxide catalyst in 100 cc. of absolute alcohol is shaken on a hydrogenation machine until the theoretical amount of hydrogen is absorbed. The catalyst is removed by filtration and dilute hydrochloric acid added until a test with pH paper indicates definite acidity.

To the acidified solution containing 2-N-piperidylmethyl-4-aminophenol, 6.4 g. of 2-methoxy-6,9-dichloroacridine is added. The mixture is heated in a steam bath for about three hours during which time a clear solution is effected followed by precipitation of the desired product as an orange dihydrochloride. After recrystallization from methanol, the product is collected on a funnel and washed with methanol and acetone; M. P. 287° C. dec.

Example 10.—2-methoxy-6-chloro-9-(3' -β - hydroxyethylaminomethyl - 4' - hydroxyanilino)-acridine dihydrochloride

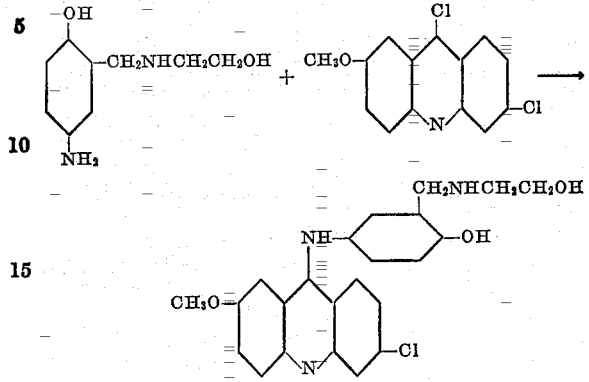

A mixture of 8.2 g. of 2-β-hydroxyethylaminomethyl-4-acetaminophenol hydrochloride (M. P. 224°) and 17 cc. of concentrated hydrochloric acid is heated at boiling temperature for an hour. The solution is cooled somewhat and the acidity adjusted to about pH 4 by the addition of strong alkali solution. To the hydrolysate, 8.3 g. of 2-methoxy-6,9-dichloroacridine suspended in 20 cc. of alcohol is added and the mixture heated in a steam bath for over an hour. The precipitated orange dihydrochloride is collected and recrystallized from methanol; M. P. 282° C. dec.

Example 11.—9-(4'hydroxy-3'-diethylaminoethylanilino)-acridine dihydrochloride

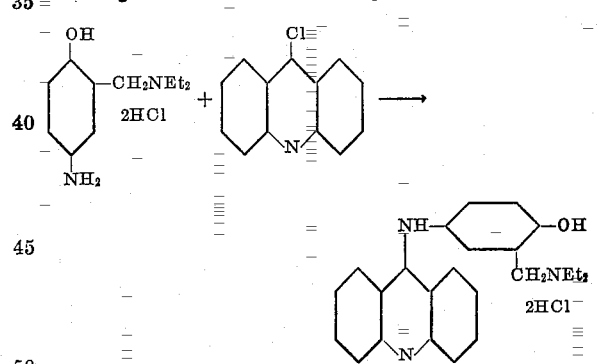

By reacting 9-chloro acridine with 2-diethylaminomethyl-4-aminophenol dihydrochloride in the manner described in Example 1, 9-(4'-hydroxy - 3' - diethylaminomethylanilino) acridine dihydrochloride is obtained; M. P. 265° C. dec.

Other compounds of this invention may be prepared in a manner similar to that shown in the above examples by condensing compounds P and H. The following are representative examples of compounds P:

1. 2-diethylaminomethyl-4-t-butyl - 6 - aminophenol
2. 2-diethylaminomethyl-4 - amino - 6 - chlorophenol
3. 2-diethylaminomethyl-4-amino - 6 - methylphenol
4. 2-diethylaminomethyl-4 - chloro - 6 - aminophenol
5. 2-diethylaminoethyl-4-amino - 6 - allylphenol
6. 2-diethylaminomethyl-4-amino - 6 - bromophenol
7. 2-diethylaminomethyl-4-amino-6 - butylphenol
8. 2-diethylaminomethyl-6-aminophenol 9. 2-dimethylaminomethyl-4-aminophenol
10. 2-di-(β-hydroxyethyl) - aminomethyl - 4 - aminophenol
11. 2-ethylaminoethyl-4-aminophenol
12. 2-N-piperazinomethyl-4-aminophenol
13. 2-N-thiomorpholinylmethyl-4-aminophenol The following are representative examples of compound H:

1. 2-methoxy-6,9-dichloroacridine
2. 2-methoxy-6-cyano-9-chloroacridine
3. 2,3-dimethyl-6,9-dichloroacridine
4. 2,3-dimethoxy-6,9-dichloroacridine The compounds of this invention are useful therapeutic agents and, in general, they are characterized by their toxicity to protozoa, particularly plasmodia. These new compounds may be used in the form of their salts of hydrochloric acid, sulfuric acid, prosphoric acid, sulfamic acid, acetic acid, lactic acid, tartaric acid, gluconic acid, citric acid, and alkyl sulfonic acids or as the insoluble salt of methylene disalicylic acid.

Attention is directed to applicant's copending applications, Serial No. 539,990, filed June 12, 1944 now Patent No. 2,428,355, issued October 7, 1947, and Serial No. 629,713, filed November 19, 1945, wherein certain acridine compounds somewhat related to the compounds of the instant application are described and claimed. Attention is also directed to other copending applications wherein certain quinoline compounds are described and claimed as follows: Serial No. 556,496, filed September 29, 1944; Serial No. 576,900, filed February 8, 1945; Serial Nos. 626,906, 626,907 and 626,908, all filed November 5, 1945; and Serial No. 722,474, filed January 16, 1947.

What we claim as our invention is:

1. A compound of the class consisting of a free base and its acid addition salts, said free base having the formula,

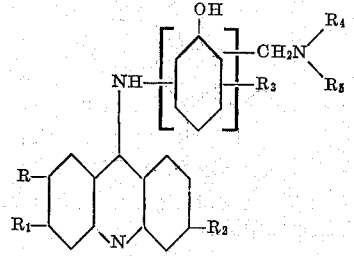

where R is a member of the class consisting of hydrogen, lower alkoxy and lower alkyl radicals, R₁ is a member of the class consisting of hyrogen, lower alkoxy and lower alkyl radicals, R₂ is a member of the class consisting of hydrogen, halogen and —CN, R₃ is a member of the class consisting of hydrogen, halogen, lower alkyl and lower alkenyl radicals, R₄ and R₅ are members of the class consisting of hydrogen, alkyl radicals containing not more than 4 carbon atoms, hydroxy alkyl radicals containing not more than 4 carbon atoms and further members wherein R₄ and R₅ together with —N< form a heterocyclic ring of the class consisting of morpholine, piperidine, piperazine and thiomorpholine and the

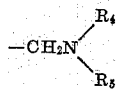

group is in one of the positions ortho and para to the —OH groups.

2. An acid addition salt of a free base, said free base having the formula,

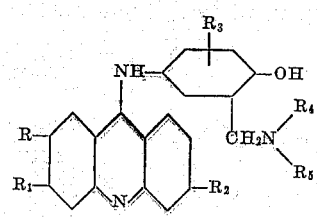

where R is a member of the class consisting of hydrogen, lower alkoxy and lower alkyl radicals, R₁ is a member of the class consisting of hydrogen, lower alkoxy and lower alkyl radicals, R₂ is a member of the class consisting of hydrogen, halogen and —CN, R₃ is a member of the class consisting of hydrogen, halogen, lower alkyl and lower alkenyl radicals and R₄ and R₅ are members of the class consisting of hydrogen, alkyl radicals containing not more than 4 carbon atoms, hydroxy alkyl radicals containing not more than 4 carbon atoms and further members wherein R₄ and R₅ together with —N< form a heterocyclic ring of the class consisting of morpholine, piperidine, piperazine and thiomorpholine.

3. A compound of the class consisting of a free base and its acid addition salts, said free base having the formula,

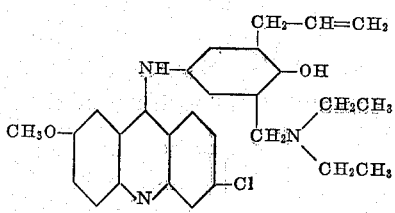

4. A compound of the class consisting of a free base and its acid addition salts, said free base having the formula,

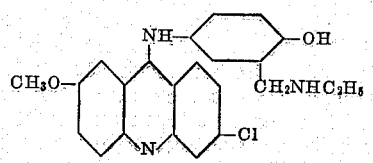

5. A compound of the class consisting of a free base and its acid addition salts, said free base having the formula,

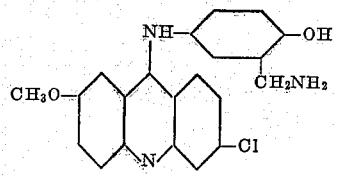

6. A compound having the formula,

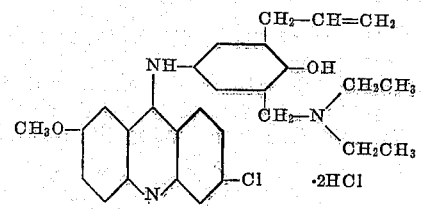

7. A compound having the formula,

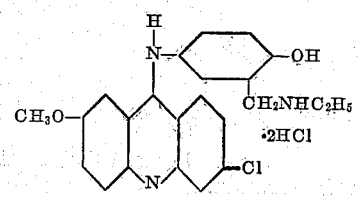

8. A compound having the formula,

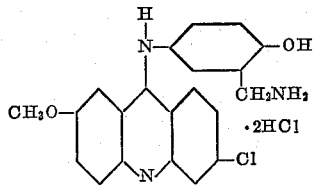

9. Process for obtaining a compound of the class consisting of a free base and its acid addition salts, said free base having the formula,

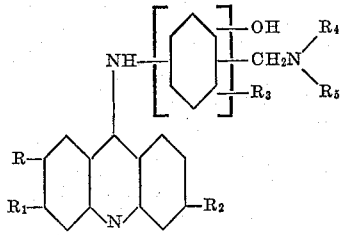

which comprises reacting a 9-haloacridine compound of the formula,

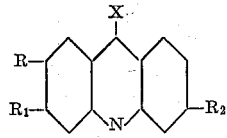

with a substituted aminophenol of the formula,

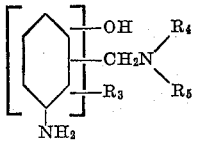

where X is a halogen atom, R is a member of the class consisting of hydrogen, lower alkoxy and lower alkyl radicals, R₁ is a member of the class consisting of hydrogen, lower alkoxy and lower alkyl radicals, R₂ is a member of the class consisting of hydrogen, halogen and —CN, R₃ is a member of the class consisting of hydrogen, halogen, lower alkyl and lower alkenyl radicals, R₄ and R₅ are members of the class consisting of hydrogen, alkyl radicals containing not more than 4 carbon atoms, hydroxy alkyl radicals containing not more than 4 carbon atoms and further members wherein R₄ and R₅ together with —N< form a heterocyclic ring of the class consisting of morpholine, piperidine, piperazine and thiomorpholine and the

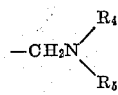

group is in one of the positions ortho and para to the —OH group.

10. Process for obtaining a compound of the class consisting of a free base and its acid addition salts, said free base having the formula,

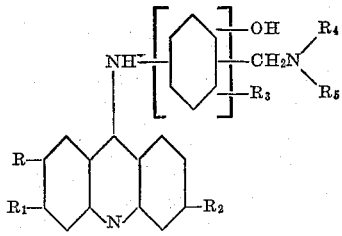

which comprises reacting a 9-halocridine compound of the formula,

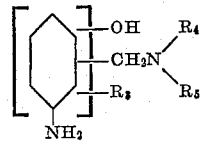

with a substituted aminophenol of the formula,

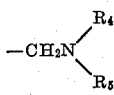

in the presence of dilute mineral acid, where X is a halogen atom, R is a member of the class consisting of hydrogen, lower alkoxy and lower alkyl radicals, R₁ is a member of the class consisting of hydrogen, lower alkoxy and lower alkyl radicals, R₂ is a member of the class consisting of hydrogen, halogen and —CN, R₃ is a member of the class consisting of hydrogen, halogen, lower alkyl and lower alkenyl radicals, R₄ and R₅ are members of the class consisting of hydrogen, alkyl radicals containing not more than 4 carbon atoms, hydroxy alkyl radicals containing not more than 4 carbon atoms and further members wherein R₄ and R₅ together with —N< form a heterocyclic ring of the class consisting of morpholine, piperidine, piperazine and thiomorpholine and the

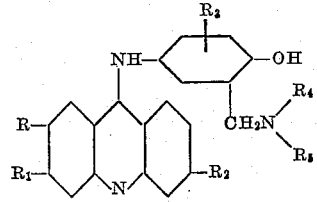

group is in one of the positions ortho and para to the —OH group.

11. Process for obtaining a compound of the class consisting of a free base and its acid addition salts, said free base having the formula,

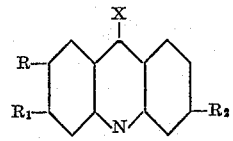

which comprises reacting a 9-haloacridine compound of the formula,

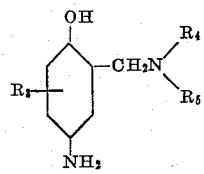

with a substituted aminophenol of the formula,

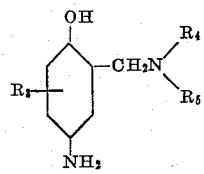

where X is a halogen atom, R is a member of the class consisting of hydrogen, lower alkoxy and lower alkyl radicals, R₁ is a member of the class consisting of hydrogen, lower alkoxy and lower alkyl radicals, R₂ is a member of the class consisting of hydrogen, halogen and —CN, R₃ is a member of the class consisting of hydrogen, halogen, lower alkyl and lower alkenyl radicals and R₄ and R₅ are members of the class consisting of hydrogen, alkyl radicals containing not more than 4 carbon atoms, hydroxy alkyl radicals containing not more than 4 carbon atoms and further members wherein R4 and R5 together with —N< form a heterocyclic ring of the class consisting of morpholine, piperidine, piperazine and thiomorpholine.

12. The process which consists in condensing a compound having the formula,

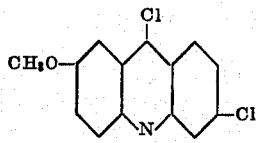

with a compound having the formula,

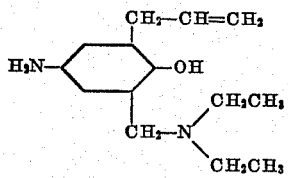

obtaining a compound of the class consisting of a free base and its acid addition salts, said free base having the formula,

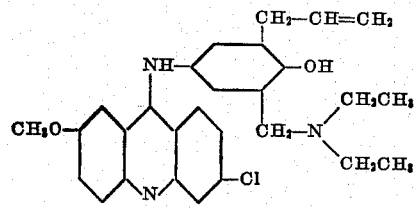

13. The process which consists in condensing a compound having the formula,

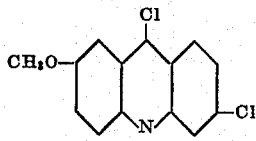

with a compound having the formula,

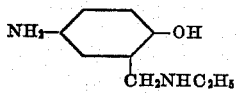

obtaining a compound of the class consisting of a free base and its acid addition salts, said free base having the formula,

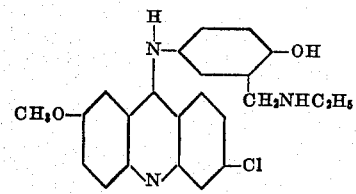

14. The process which consists in condensing a compound having the formula,

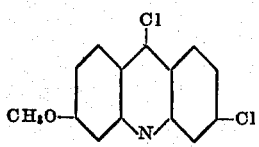

with a compound having the formula,

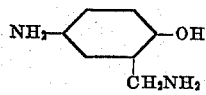

thereby obtaining a compound of the class consisting of a free base and its acid addition salts, said free base having the formula,

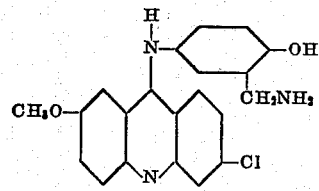

JOSEPH H. BURCKHALTER.
ELDON M. JONES.
ALBERT L. RAWLINS.
FRANK H. TENDICK.
WALTER F. HOLCOMB.

REFERENCES CITED

The following references are of record in the file of this patent:

UNITED STATES PATENTS

| Number | Name | Date |
|---|---|---|
| 2,113,357 | Mietzsch et al. | Apr. 5, 1938 |